United States Patent [19]

Wroblewski

[11] Patent Number: 4,899,338
[45] Date of Patent: Feb. 6, 1990

[54] ELECTRICAL DEVICE COMMAND SYSTEM, SINGLE WIRE BUS AND SMART OCTAL CONTROLLER ARRANGEMENT THEREFOR

[75] Inventor: Thomas R. Wroblewski, Sterling Heights, Mich.

[73] Assignee: Chrysler Motors Corporation, Highland Park, Mich.

[21] Appl. No.: 284,886

[22] Filed: Dec. 15, 1988

[51] Int. Cl.⁴ ............................................... H04J 3/14
[52] U.S. Cl. .................................... 370/85.1; 340/459
[58] Field of Search ..................... 370/85, 24; 340/459, 340/461, 438, 439, 428; 307/10.1

[56] References Cited

U.S. PATENT DOCUMENTS

| | | | |
|---|---|---|---|
| 4,227,181 | 10/1980 | Brittain | 340/459 |
| 4,296,409 | 10/1981 | Whitaker et al. | 340/459 |
| 4,736,367 | 4/1988 | Wroblewsky et al. | 370/85 |
| 4,740,952 | 4/1988 | Vernieres et al. | 370/24 |
| 4,780,620 | 10/1988 | Högberg et al. | 370/85 |

Primary Examiner—Douglas W. Olms
Assistant Examiner—Min Jung
Attorney, Agent, or Firm—Wendell K. Fredericks

[57] ABSTRACT

A multiplex system for addressing, commanding and monitoring the status of a plurality of electrical devices disposed throughout a motor vehicle. A dual-duty cycle type voltage waveform generated by a microcomputer provides address signals for enabling four individual controllers connected to a bi-directional single wire bus coupled at one end to a driver and receiver circuit of the microcomputer. After the individual controller is addressed, another portion of the waveform provides information for operating one of the eight electrical devices connected thereto in response to a polarity control data bit portion of the same voltage signal to turn the connected element either ON or OFF. Circuits within the addressed controller provides current signal indicative of the ON or OFF status of the electrical device.

8 Claims, 9 Drawing Sheets

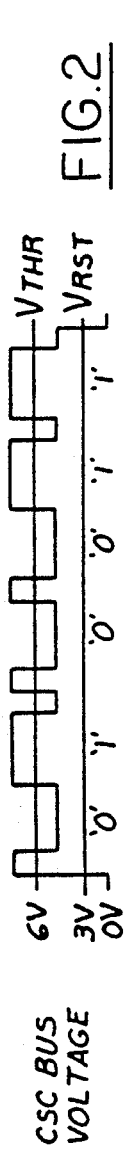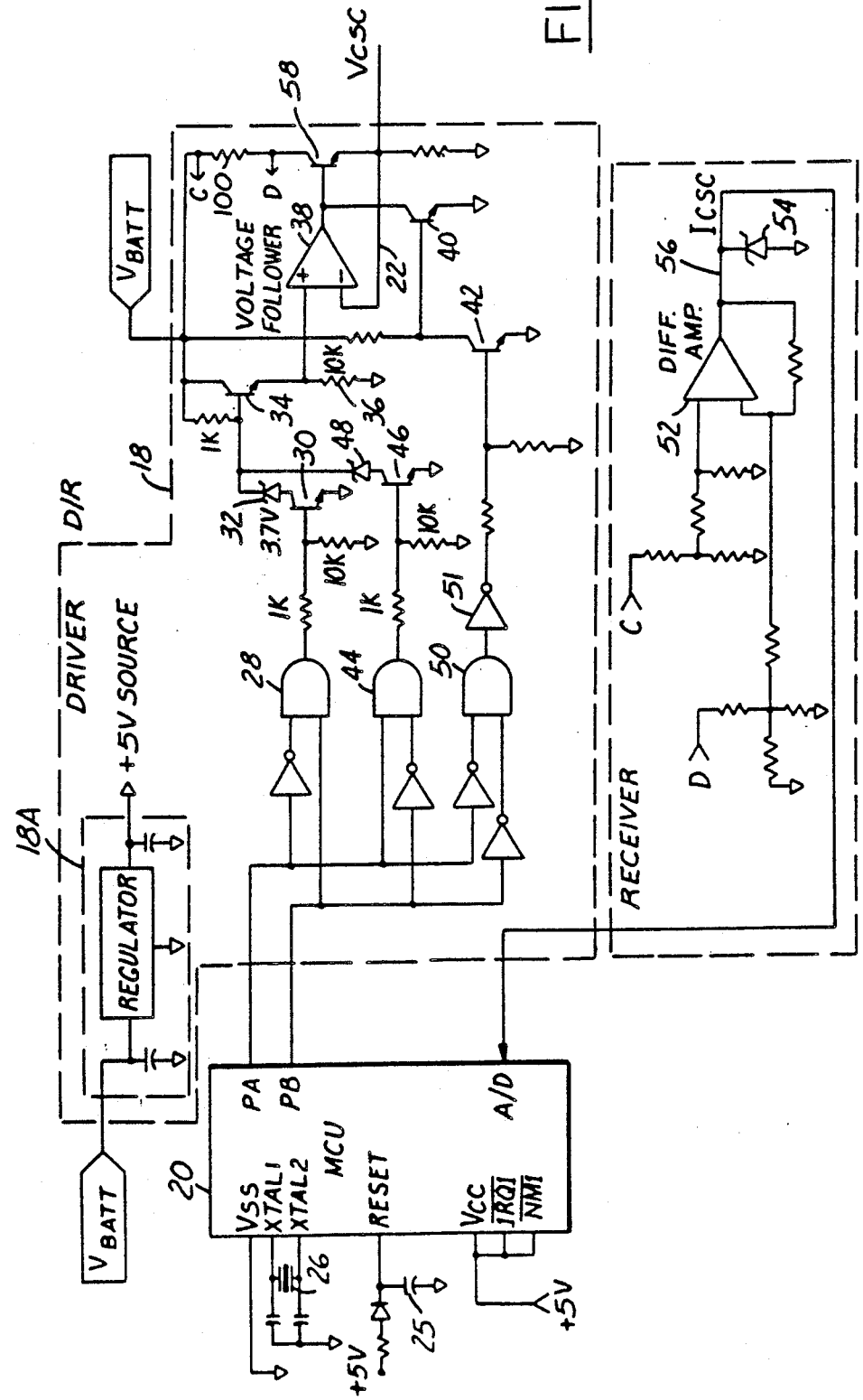

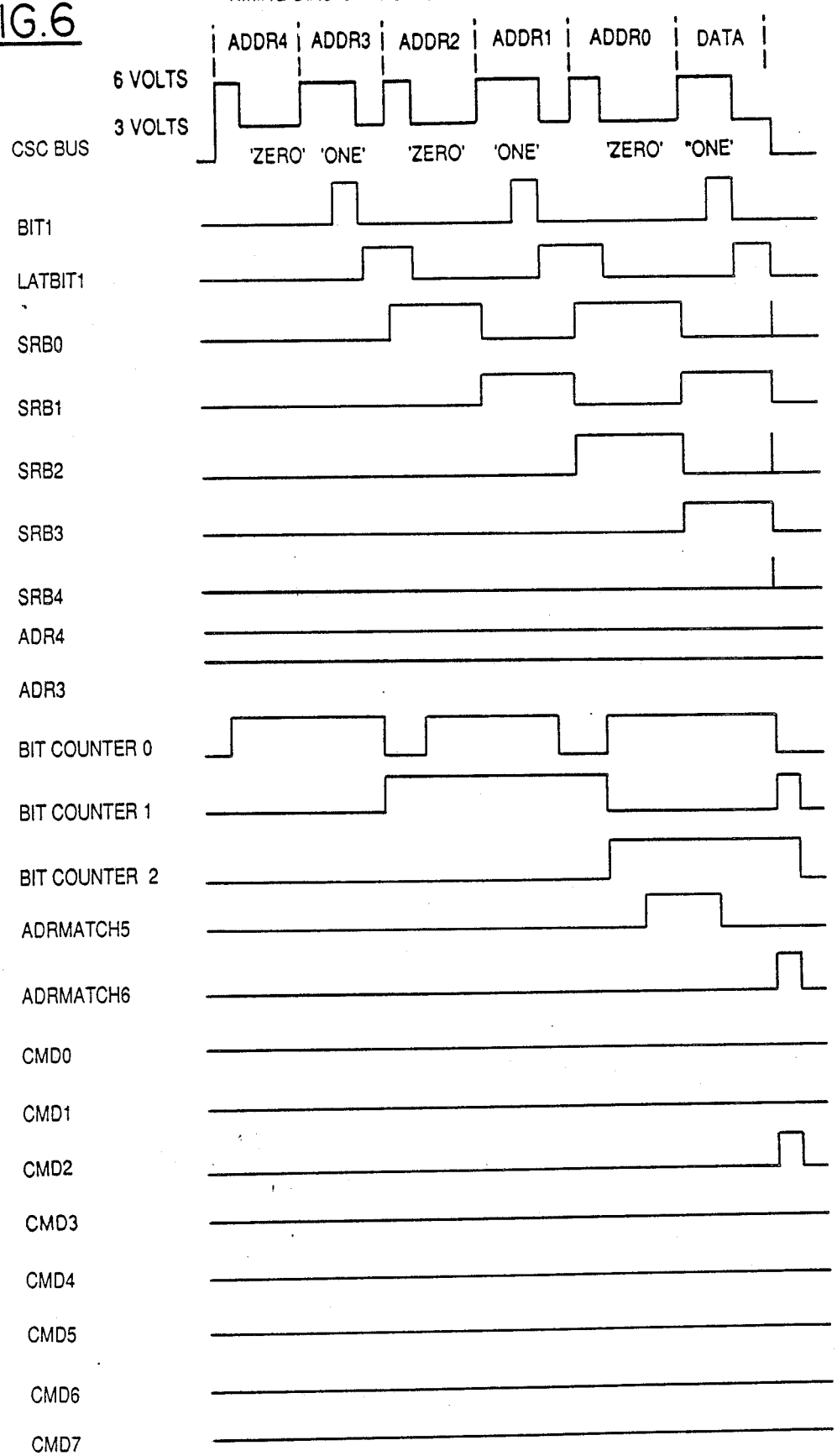
FIG.6 TIMING DIAGRAM FOR OCTAL RELAY CONTROLLER

ELECTRICAL DEVICE COMMAND SYSTEM, SINGLE WIRE BUS AND SMART OCTAL CONTROLLER ARRANGEMENT THEREFOR

BACKGROUND OF THE INVENTION

1. Field of the Invention

This invention relates to multiplexing techniques for controlling operation and obtaining status, over a single wire bus, of a plurality of electrical devices disposed throughout a motor vehicle and, more particularly, in a preferred embodiment to systems for commanding the operation of a plurality of smart octal controllers each of which controls the operation and senses the status of a group of eight electrical devices such as a motor, a lamp, a relay, etc. disposed near the octal controller.

2. Description of the Prior Art

The present inventor and Frederick O. R. Miesterfeld in U.S. Pat. No. 4,736,367 entitled "Smart Control and Sensor Devices Single Wire Bus Multiplex System", which issued Apr. 5, 1988, taught using a plurality of smart control elements for controlling individual relay drivers that operate individual conventional mechanical relays to switch ON and OFF motors, other relays, lights, etc. and using a plurality of smart sensors to monitor the operation of a plurality of switches; i.e., whether the switches are open or closed. Also, this system provides diagnostic information concerning the smart control elements and smart sensors.

Each smart control element and each smart sensor connects at a separate single point on a single wire bus. A microcomputer and a driver/receiver circuit develops and places on the bus a particular offset square wave pulse train which provides power and control voltage signals to the plurality of smart control elements and smart sensors.

The smart control devices contain circuits that respond to the offset, square wave, pulse train in a manner causing each smart control element to drive an associated relay driver after a chosen number of polling cycles dictated by address codes formed by various voltage levels of the pulse train. Current signals are sent over the bus back to the driver/receiver circuit indicative of the status of the smart control device.

The smart sensors contain circuits that respond to the square wave pulse train in a manner that causes each smart sensor to send current signals back over the single wire bus to the driver/receiver circuit and then on to the microcomputer during designated repetitive and sequential time slots.

The driver/receiver circuit receives, interprets and converts the current signals from the smart control elements and the smart sensors into voltage signals used by the microcomputer for establishing a history of the status of the bus, the control elements, the sensors and the switches.

The microcomputer supplies continuous and updated information to a display system indicative of the status of each control element and each sensor and its associated switch.

This system requires wave train signals to poll and address the same control element several times before the associated relay driver circuit operates the relay. This polling scheme obviously consumes added time to effect the operation of the end device.

SUMMARY OF THE INVENTION

The instant invention comprises a multiplex system for addressing, commanding and monitoring the status of a plurality of electrical devices disposed throughout a motor vehicle. A smart octal controller circuit turns ON or OFF, individually, eight (8) devices such as a motor, relay and/or lamp mounted at remote locations.

Each one of the smart octal controllers connects at a single point along a bi-directional, single wire bus for receiving and interpreting address and command signals sent over the bus by a driver/receiver circuit (D/R). The D/R receives preprogrammed binary signals from a microcomputer containing address and command information for operating the designated electrical devices and then sends this information over the bus in the form of a series of, illustratively, six pulses of a dual-duty cycle format to the smart octal controllers.

The octal controllers convert the six pulses into a two-bit address code for addressing one of the four octal controllers and a three-bit command code for selecting one of the eight electrical devices connected to each controller and a one-bit polarity code for controlling whether to turn ON or OFF the electrical device. The two-bit code operates after the controller receives the first five pulses. If a match exists between the two-bit code and a two-bit preprogrammed address of the controller, that particular controller is enabled. To acknowledge the enablement, that particular controller sends a current signal back over the bus to the D/R which, in turn, converts the current signal into a voltage signal that routes to an A/D converter within the microcomputer.

The microcomputer then sends back to that particular controller via the same route the one-bit polarity code which determines whether to command ON or OFF that electrical device selected by the three least significant bits.

The smart controllers contain circuits for detecting the status of the electrical device and then sending a status indication in the form of a current signal back over the bus to the D/R. The D/R, in turn, transfers this information as a voltage signal to the A/D converter circuit self-contained in the microcomputer. The microcomputer reads the output of the A/D converter and conveys the status information to a display unit which provides visual status information about the commanded electrical device.

BRIEF DESCRIPTION OF THE DRAWING

FIG. 2 depicts the five-state bus voltage signal illustrative of an address and a data message transmitted to the smart octal controllers;

FIG. 2a depicts the conversion of the five-state bus voltage signal into the logic 1 and logic 0 signals;

FIG. 3 shows a schematic diagram illustrative of a driver/receiver circuit connected between the single wire bus and the microcomputer;

FIG. 6 depicts the timing sequence for commanding the electrical device.

DETAILED DESCRIPTION OF A PREFERRED EMBODIMENT

Figure 1:
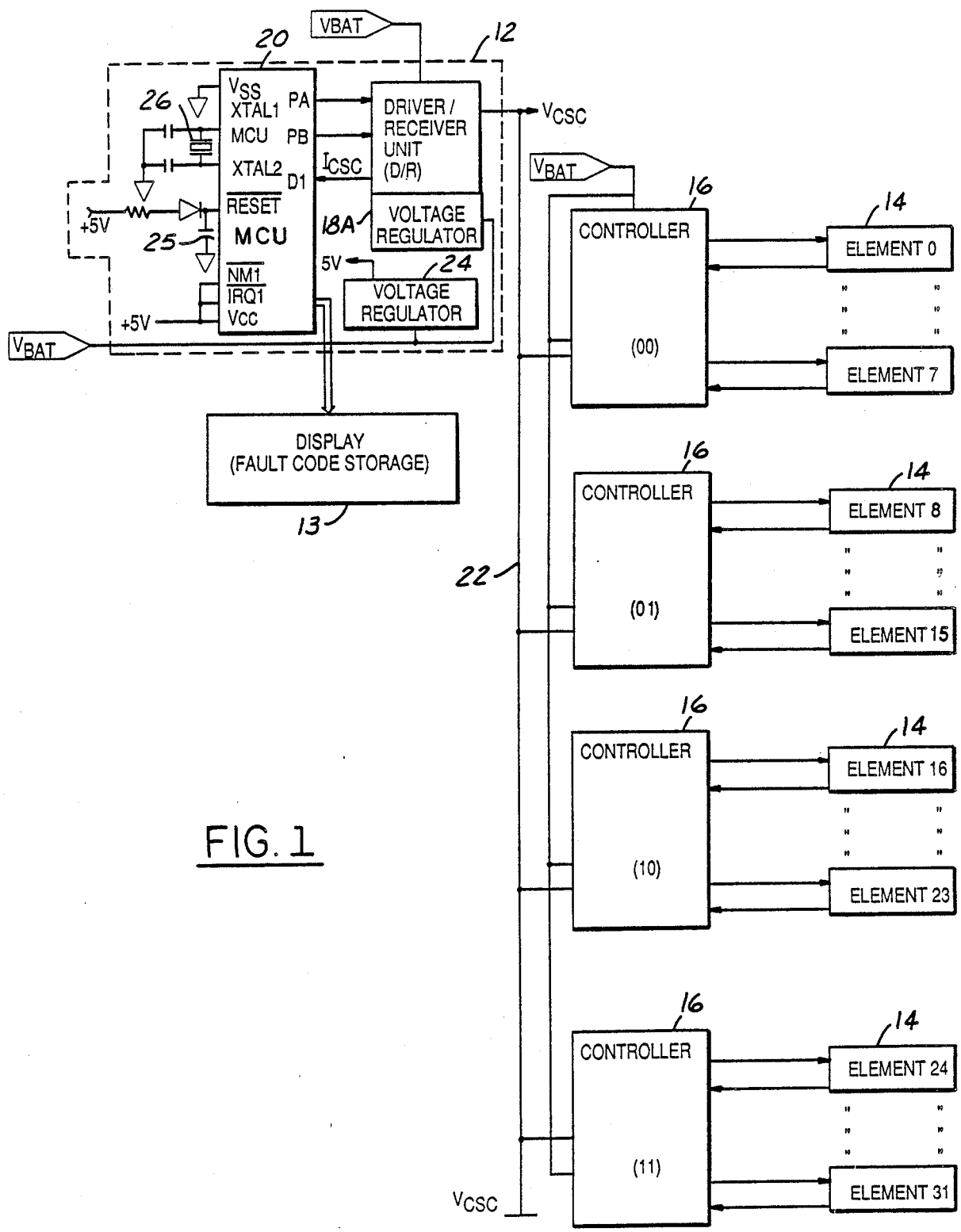
FIG. 1 depicts a partial block, partial schematic diagram of a command operated smart octal controller, single wire bus multiplex system.

Referring now to FIG. 1, this figure illustrates a partial block, partial schematic diagram of a preferred embodiment of an electrical device command system, single-wire bus and smart octal controller arrangement 10. With +12 volts DC battery supply voltage ($V_{BAT}$) applied to the instrument compartment of a motor vehicle incorporating system 10, commands can place each electrical device ON or OFF and the commanded device can provide a status indication in response to the command. Generally, the negative input of the battery voltage provides a circuit ground or a 0 volt potential. System 10, as shown in FIG. 1, includes a microcomputer (MCU) 20, a driver/receiver unit (D/R) 18, a single wire bus 22, four smart octal controllers 16—16 with eight (octal) electrical devices (elements) 14—14 per controller 16.

DRIVER/RECEIVER UNIT

In order to address the elements 14—14, located at various remote locations of the motor vehicle, MCU 20 sends command signals to D/R 18. The instrument compartment 12 houses both the D/R 18 and MCU 20. Voltage from the 12 volt automobile battery supplies 12 V power to 12 V circuits of a 5 volt regulator circuit 18A associated with D/R 18 and to another 5 volt regulator circuit 24. Regulator 24 generates a precise output voltage (e.g., 5 VDC±5%) used by MCU 20. Regulator 24 also provides, after an externally programmed delay, a 5 VDC signal for resetting MCU 20 during a POWER-ON phase. The 5 VDC signal supplied to a NOT RESET terminal of MCU 20 provides a delayed signal allowing D/R 18 to get ready for MCU 20 commands. Capacitor 25 provides the external programmed delay function, holding the output voltage of regulator 24 LOW for a fraction of time (e.g., 20 ms) delaying start-up of MCU 20. After the delay, the NOT RESET signal goes HIGH and MCU 20 starts executing a factory installed program (the main software program) stored in a ROM (not shown) of MCU 20.

MCU 20, illustratively, a single chip 8 bit unit such as a Motorola MC68705S3 microcomputer chip contains a CPU, an on-chip clock, a ROM, a RAM, an input/output circuit (I/0), an analog to digital converter (AD) and a timer. An external oscillator 26 controls the on-chip clock.

MCU 20 generates logic signals at ports A and B which route to D/R 18 for developing a bus undulatory voltage square-wave $V_{csc}$ signal over bus 22 similar to that shown in FIG. 2. D/R 18 contains circuits responsive to logic signals from MCU 20 which develop voltage levels used to create $V_{csc}$. The logic signals from port A and port B of MCU 20 selectively employ logic circuits in D/R 18 to develop 25 percent and 75 percent duty cycle pulses that represent LOW and HIGH signals respectively. FIG. 2 shows dual-duty cycle voltages.

D/R 18 includes driver circuits for driving the $V_{csc}$ signal over the single wire bus 22. The $V_{csc}$ signal contains address information and command messages in a preferred embodiment for each of four (4) controllers 16—16 connected to bus 22. The $V_{csc}$ signal can provide, illustratively, five address bits and a command bit message for each of the four controllers. A reset bit separates each message sent over bus 22.

Each controller 16 connects to bus 22 by a single wire The output of each controller has eight (8) output command lines going to the electrical devices associated with the controller; and eight (8) status lines coming from the electrical devices to eight input ports on each controller. An address code (e.g.,00; 01; 10, etc.) for each controller is preprogrammed by a hard-wire code or individual switches.

After initialization of registers and memories in MCU 20, and in accordance with the main program, code signals from port A and B of MCU 20 generate the $V_{csc}$ signals for commanding the controllers 16—16 connected to bus 22.

With reference now to FIG. 2, 2A and 3, as noted in FIG. 2, the $V_{csc}$ signal comprises five states, mainly an offstate or zero volt, a reset ($V_{RST}$) state illustratively 2.5 volts, a three-volt state, a threshold-voltage ($V_{THR}$) state of approximately 4.5 volts and a six-volt state. To generate these various states, the logic circuitry in D/R 18 of FIG. 3 produces several levels of voltage signals. The reset state occurs during transitions from zero-volt to the three-volt state or vice-versa; the threshold state results during the transitions from the three-volt to the six-volt state as well as the transition from the six-volt to the three-volt state.

As shown in FIG. 3, to generate the three-volt state, AND gate 28 must receive a LOW signal from port A of MCU 20, and a HIGH signal from port B. When gate 28 turns ON, a base voltage of about 0.6 volt turns ON transistor 30. When transistor 30 turns ON, NPN transistor 34 receives a base voltage of about 3.7 volts. A 3.7 volt-zener diode 32 connected in the collector path of transistor 30 limits the base voltage of transistor 34. With the 3.7 volts voltage applied to transistor 34, an emitter voltage of approximately 3.1 volts enters the non-inverting input of voltage follower 38 limited by input resistor 36. Voltage follower 38 produces an output voltage of about 3.8 volts which is approximately 0.7 volt above the input voltage. When NPN transistor 58 turns ON in response to the output voltage from voltage follower 38, an emitter voltage of about 3-volts appears on bus 22.

To generate the six-volt state, AND gate 44 turns ON when programmed by MCU 20 with a HIGH signal from port A and a LOW signal from port B. With gate 44 ON, a base voltage of approximately 0.6 volts turns transistor 46 ON. When transistor 46 turns ON, NPN transistor 34 turns ON as a result of a base voltage of approximately 6.7 volts regulated by zener diode 48. The emitter voltage from transistor 34 applies about six volts to the non-inverting input terminal of voltage follower 38 producing an output voltage of about 6.7 volts. Bus 22 connected to the emitter of transistor 58 rises to six volts.

To generate the OFF-state or zero-volt, AND gate 50 must receive a LOW signal from ports A and B of MCU 20. The output of inverter 51, connected at the output of AND gate 50, goes LOW to turn ON NPN transistor 42. When transistor 42 turns ON, NPN transistor 40 also turns ON placing the output of voltage follower 38 at a voltage less than 0.6 volt causing transistor 58 to remain OFF. With transistor 58 turned OFF, the OFF-state or zero-volt is established for bus 22.

As mentioned supra, the reset state is established during the transition from zero volt to the three-volt state. And the address messages occur during transitions between the three-volts and six-volts state. Also, note that the address bits occur during the three to six volt transition. The LOW bits are the 25 percent duty cycle pulses or 250 microseconds duration and the HIGH bits are 75 percent duty cycle pulses or 750 microseconds duration.

FIG. 2A illustrates the saw-tooth waveform generated by controller 16 after integrating the square-wave $V_{csc}$ signal.

The receiver portion of D/R 18 will be discussed infra.

SINGLE WIRE BUS

As mentioned supra, bus 22, a bi-directional single wire communication assembly, permits transmitting address and command information to each octal controller 16—16 connected to the bus and current signals or status information from the controllers back to D/R 18. This single wire assembly, a flexible length of wire of a suitable gauge covered with an insulated material at all points except for the controller interface regions, routes in the vicinity of all the octal controllers.

ELECTRICAL DEVICES

The electrical devices or elements shown in FIG. 1 controlled and monitored by system 10 include lamps, motors, relays, etc. The outputs from octal controller 16 sources about 10 mA at about 10 volts (with a supply voltage of 12 volts). The status input lines to octal controller 16 from the electrical devices sink about one mA of current.

SMART OCTAL CONTROLLER CIRCUIT

Figure 4A:
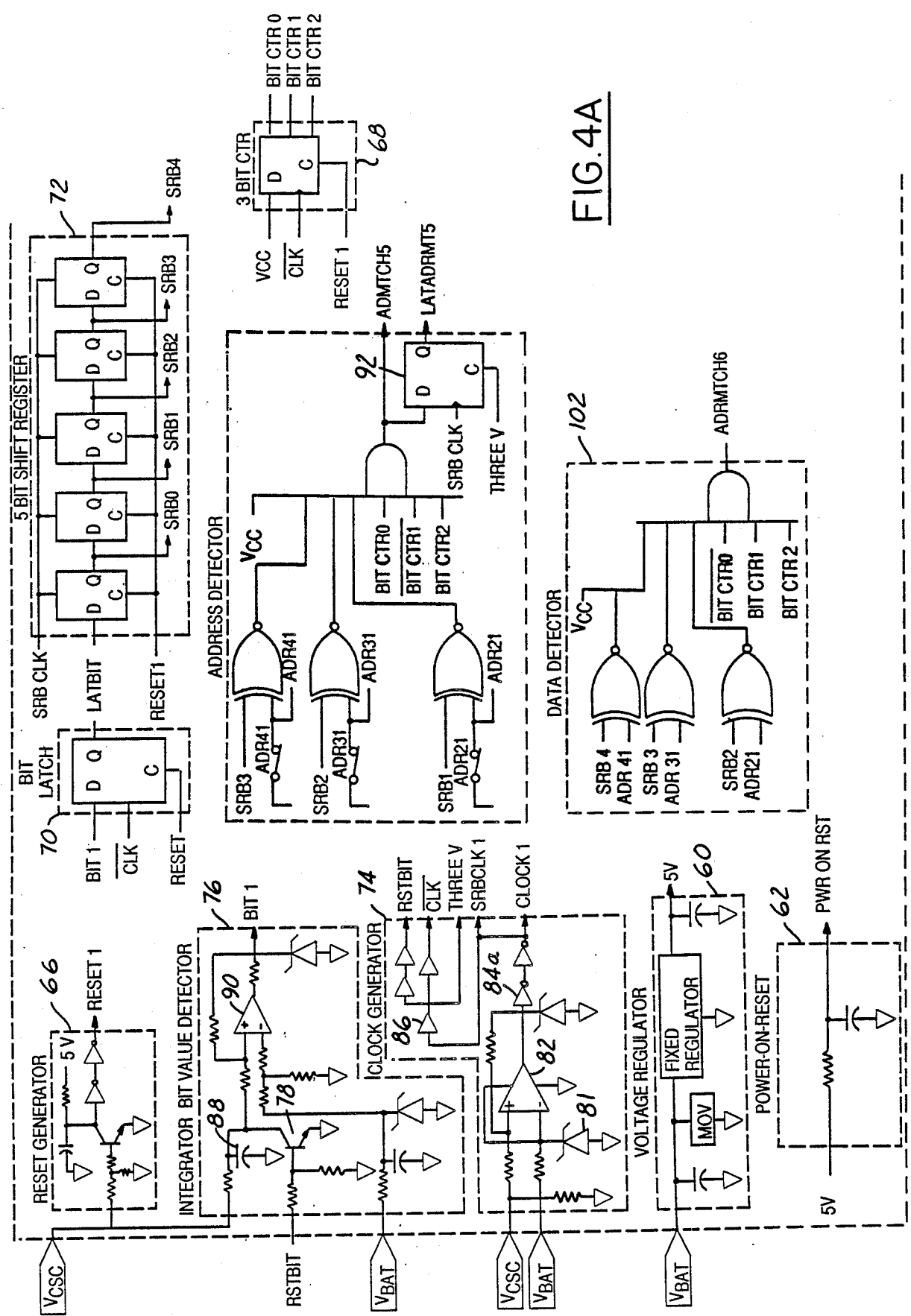
FIG. 4A illustrates a schematic diagram of circuits in a controller for receiving address and data messages and for developing commands, from the messages for commanding the electrical devices.
Figure 4B:
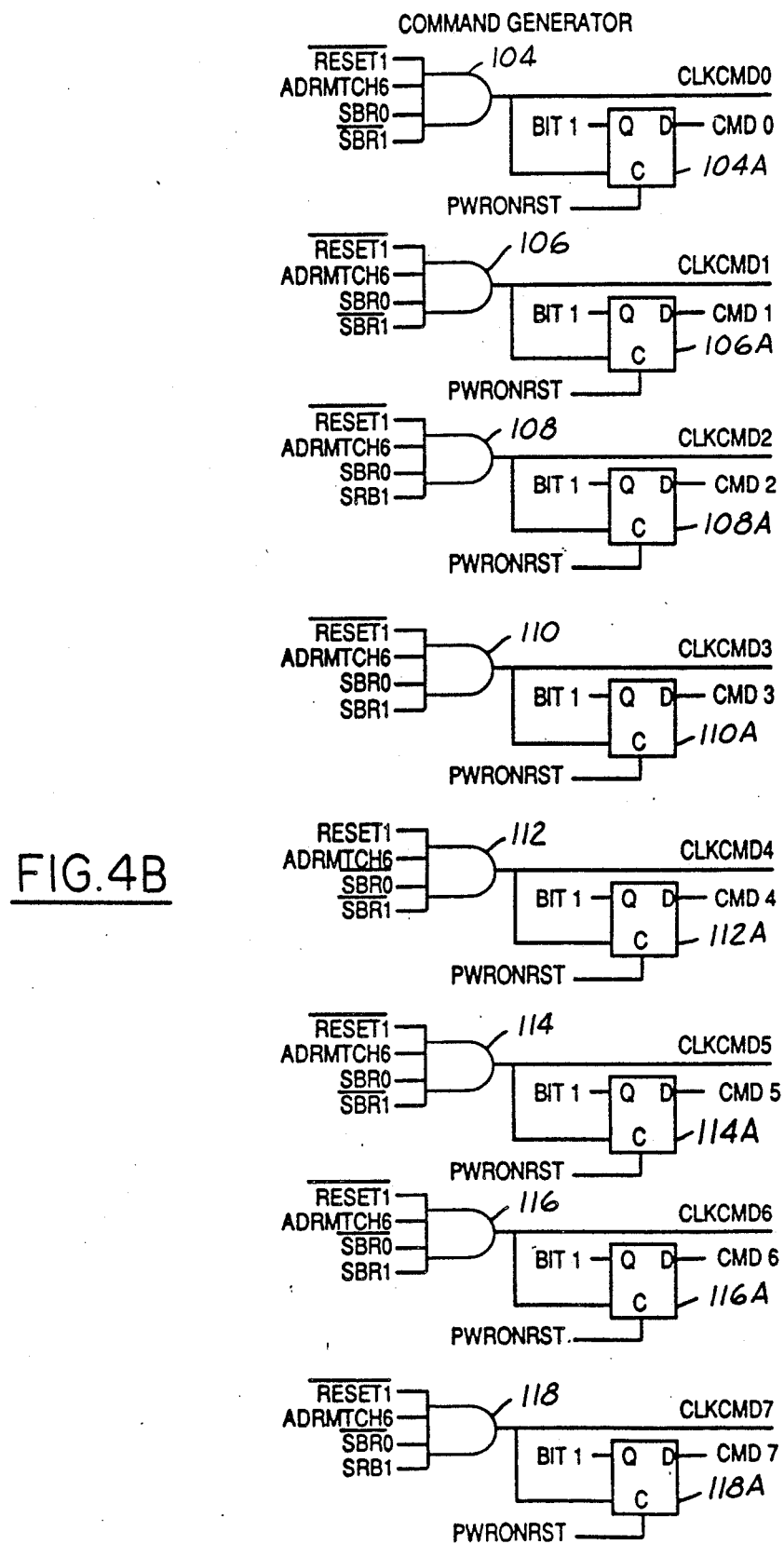
FIGS. 4B–4D show a continuation of the schematic diagram of the circuits of the controller that use the data messages to provide status, information regarding commanded elements.
Figure 4C:
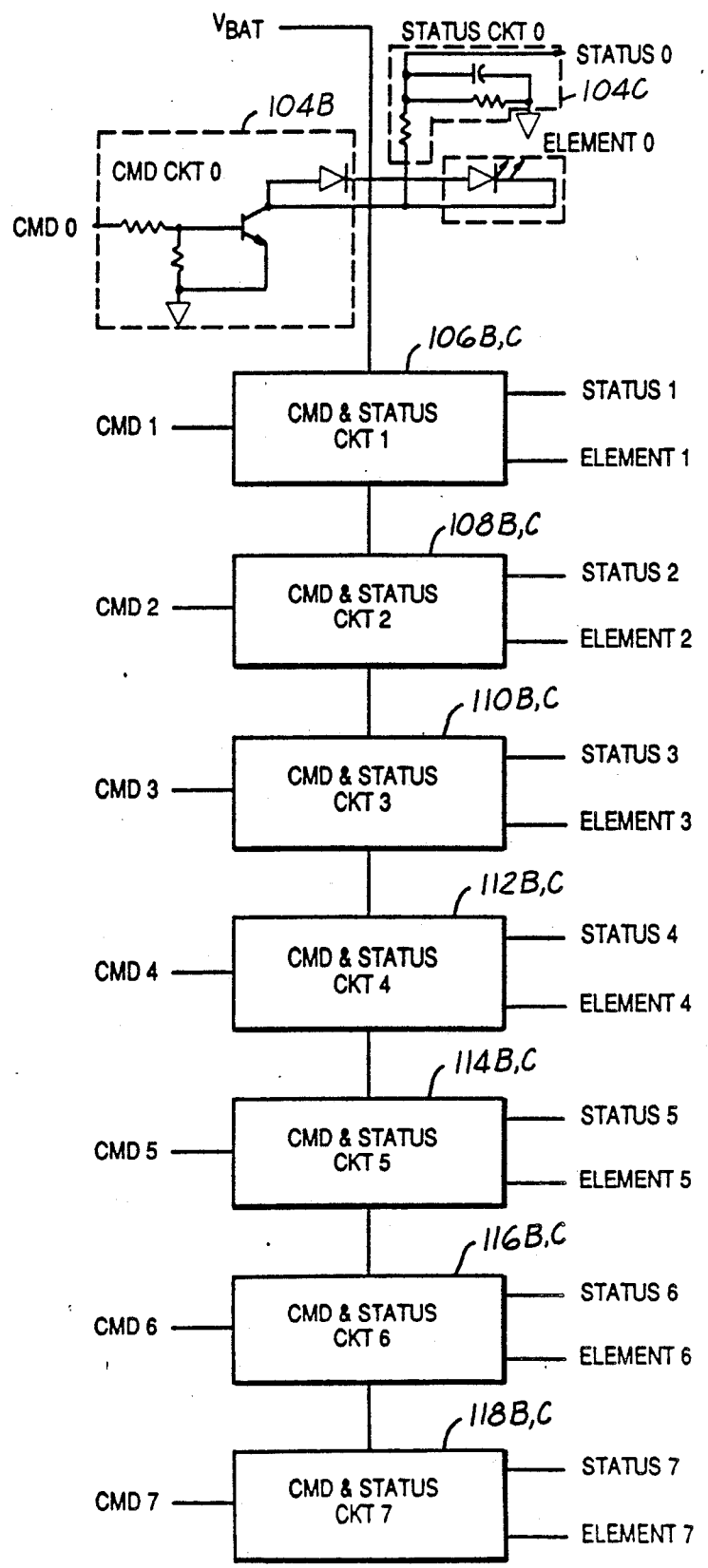

Referring now to FIGS. 4A and 4B, a partial-block, partial-schematic diagram depicts the smart octal controller 16 including the various controller subsections. Each controller 16 sends commands to up to eight electrical devices 14, receives status messages from the devices and then transmits status messages to D/R 18. The 12 volt battery supplies power to controller 16. Several circuits in controller 16 utilize the battery voltage including a voltage regulator 60 which produces a fixed and regulated approximately 5 VDC for powering controller 16. Regulator 60 supplies power to all the logic circuits of controller 16 and initiates a POWER-ON-RESET signal from a POWER-ON-RESET circuit 62. This POWER-ON-RESET signal resets the flip-flops in the command generator circuit 64 used to provide commands to the electrical devices 14.

Bus 22 brings the $V_{csc}$ signal to the various circuits in controller 16 requiring the $V_{csc}$ signal. A RESET generator 66 uses the zero-to three-volt transition or the three-to zero-volt transition of $V_{csc}$ to generate a RESET 1 signal used to reset a three bit counter 68, a bit latch 70, and a five-bit shift register 72.

Clock generator 74 uses the $V_{csc}$ and the battery voltage to generate five different clock signals, namely RSTBIT, NOT CLK, THREEV clock, SRBCLK-1 and CLOCK-1. The RSTBIT clock signal resets an integrator and bit value detector 76 after the detection of each bit from $V_{csc}$. The NOT CLK signal clocks a series of BIT 1's into the bit latch 70 after the bits are detected by the integrator and bit value detector circuit 76. The THREEV clock resets a LATADRMT 5 latch in an address detector circuit 80 after the detection of an address. The NOT CLOCK-1 signal clocks a five-volt $V_{cc}$ signal into the three bit counter 68. The SRBCLK-1 signal clocks bits from bit latch 70 through the five-bit shift register 72. The CLOCK-1 signal goes to selected logic gates used to generate the previously mentioned four clock signals. Clock generator circuit 74 generates the CLOCK 1 signal by having the battery voltage limited by a zener diode 81 to approximately 4.7-volts. This voltage provides a reference voltage at the inverting terminal of comparator 82, while the non-inverting terminal of comparator 82 follows the transitions of the Vcsc between the three-and six-volt states. Comparator 82 provides a HIGH signal when $V_{csc}$ passes through, illustratively, the threshold voltage of about 4.7-volts up to the six-volt state and remains HIGH until the $V_{csc}$ goes from the six-volt state towards the three-volt state on the trailing edge of Vcsc. A pair of HEX-SCHMITT TRIGGER INVERTERS 84, not required except when this system is implemented in programable logic arrays used in a programmable logic device (PLD) embodiment of system 10, sharpens the clock edges of the CLOCK 1 signal during clock transitions. With the first inverter 84A inverting the output voltage from comparator 82 to LOW and the second inverter 84B inverting the output of inverter 84A to HIGH or five-volts. The output from inverter 84B, the CLOCK-1 signal, generates the SRBCLK-1 signal directly, the RSTBIT clock, THREEV, and the NOT CLK signals indirectly through an inverter 86.

BIT VALUE DETECTION

Integrator and bit value detector circuit 76 receives Vcsc as an input to an integrator circuit 88 and receives a RSTBIT clock signal as an input to a base-bias circuit of transistor 78. As mentioned supra, $V_{csc}$ varies between voltage states ranging from 0 volt through a reset voltage of around 2.5 volts through the 3 volt state and up to a voltage threshold state of around 4.7 volts to the six-volt state. MCU 20 of FIG. 3 causes the bus voltage to generate duty cycles signals between three volts and six volts. When transmitting address bits over bus 22 as mentioned supra, a 25 percent duty cycle pulse represents a LOW signal and a 75 percent duty cycle pulse represents a HIGH signal. The integrator 88 of FIG. 4A in circuit 76 responds to the three to six-volt transitions for both type duty cycle pulses. The capacitor in the integrator circuit 88 starts charging during the three-to six-volt transition of $V_{csc}$ and continues charging for as long as the voltage is at 6 volts (above the 4.7 volt threshold). If a 25 percent duty cycle pulse or LOW signal is provided on $V_{csc}$, the charging period of the capacitor in integrator 88 is reduced. If a 75 percent duty cycle or HIGH signal is provided on $V_{csc}$, the charging time of the capacitor of circuit 88 is expanded for a period three times that used for establishing the LOW signal. When forming the LOW signals, the integrator capacitor charges up to a voltage below the reference voltage applied to the inverting input comparator 90. This reference voltage is approximately 1.8 volts, when forming the LOW signals. The LOW signal is read as a LOW BIT 1 output signal from comparator 90. When forming the HIGH signals, the capacitor of integrator 88 charges to about three-volts causing the non-inverting input of comparator 90 to exceed the reference voltage applied to the inverting input. Comparator 90 issues a HIGH BIT 1 when the capacitor of integrator 88 exceeds the reference voltage. Once the HIGH or LOW BIT 1 forms, and $V_{csc}$ returns to the three-volt state, the BIT 1 signal is latched into bit latch 70 and the RSTBIT clock signal resets circuit 76 by causing a base-bias voltage which turns ON transistor 78 grounding the integrator 88 at the input to the inverting input of comparator 90.

CONTROLLER ADDRESS MATCHING

After each BIT 1 is generated, the NOT CLK signal clocks that bit into bit latch 70. As each bit is latched, three-bit counter 68 counts the number of times the NOT CLK signal is used for latching BIT-1 into bit latch 70. The NOT CLK signal appears on the trailing edge of the six to three-volt transition of the bus voltage signal.

Prior to latching the next BIT-1 into bit latch 70, the previous bit is transferred to the five-bit, shift register 72 and is called a LATBIT Signal. The SRBCLK signal clocks each LATBIT signal through register 72.

After the three bit counter 68 counts to five, the SRB3 and SRB2 bits from register 72 are compared with the preprogrammed addressed bits, ADR41 and ADR31, respectively, in address detector 80. If an address match occurs when the 3 BIT CTR 68 counts to five (BIT CTR0, NOT BIT CTR1 AND BIT CTR 2), a ADMTCH 5 signal is latched in latch 92 when the next SRBCLK 1 signal occurs.

RECEIVER PORTION OF D/R UNIT-CONTROLLER ACKNOWLEDGEMENT

The LATADRMT5 signal produces a SINK NOT signal from the output of AND gate 96 of FIG. 4B which turns ON transistor 98 grounding bus 22 through a resistor at the controller end. The voltage difference across point C and D of resistor 100 of driver 18 of FIG. 3 increases causing difference amplifier 52 to produce an increased voltage signal on line 56 representing the current signal $I_{csc}$, which routes to the A to D converter input of MCU 20. This current signal to MCU 20 is an acknowledgment that the controller 16 is listening and recognizes its address. If MCU 20 does not detect that the controller is listening, it puts bus 22 into RESET and tries again without transmitting the data bit.

DATA DETECTING

After the acknowledgement that controller 16 is listening, MCU 20 sends the sixth bit or data bit. The previous BIT 1 latched in bit latch 70 shifts into the 5-bit shift register 72 filling register 72 and providing the two-bits (SRB4 and SRB3) needed to generate an ADRMTCH 6 signal and the three bits (SBR0, SBR1 or SBR2 of the proper polarity) needed to select which one of the eight electrical devices MCU 20 desires to command. The sixth bit in the form of BIT 1 routes directly to the latch of command generator 64 to cause the desired command signal (CMD) to go either HIGH or LOW in response to the polarity of BIT 1.

COMMANDING THE ELECTRICAL DEVICES OR ELEMENTS

In this embodiment, each octal controller may command eight different electrical devices using CMD0-CMD7 signals.

Figure 4D:
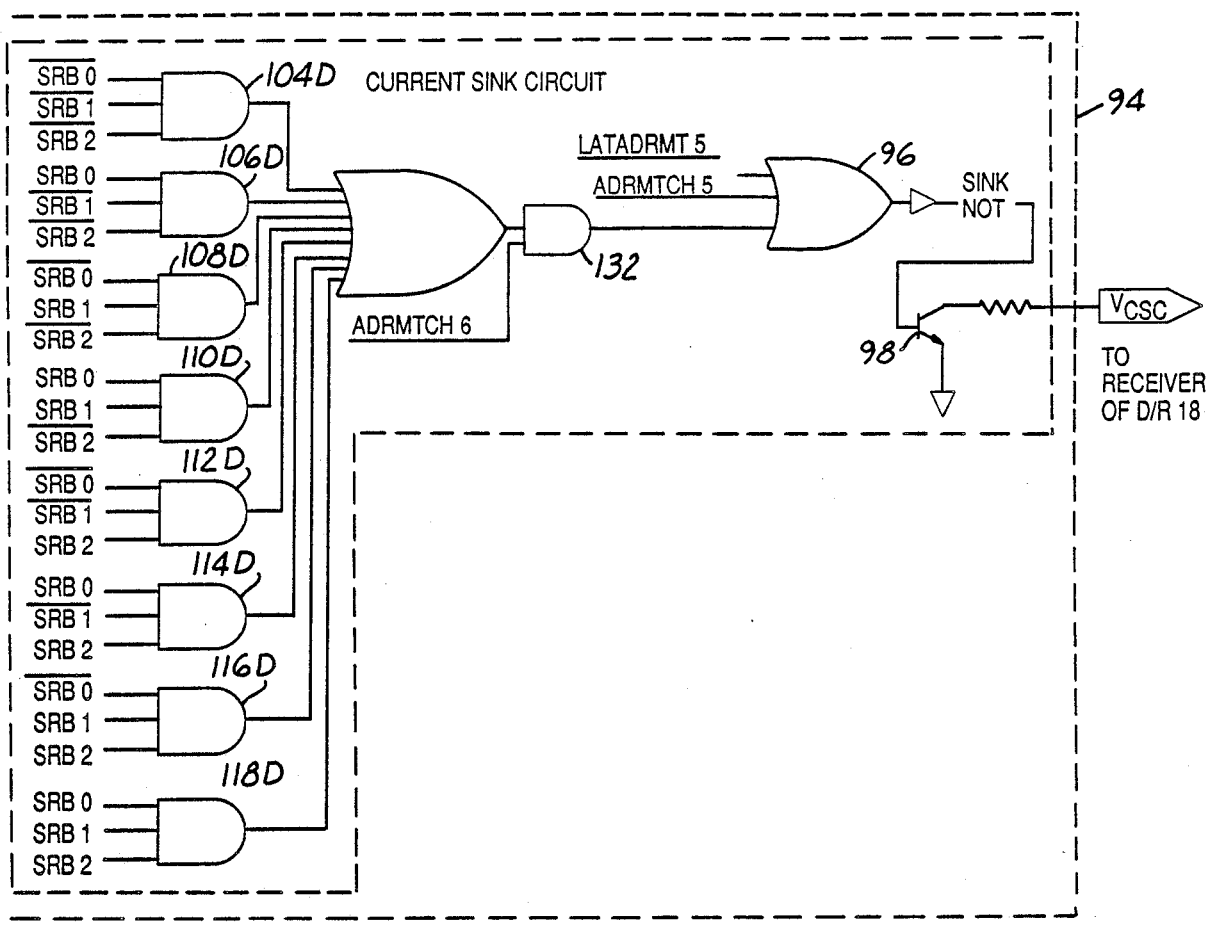

If MCU 20 desires to command ON element 0, the CMD0 signal from latch 104A turns ON a CMD CKT 0 circuit 104B which activates the electrical device or element 0. When element 0 activates, a status 0 signal from circuit 104C routes to AND gate 104D of the current sink circuit 94. The status 0 signal is added with the three-least significant bits of register 72 of FIG. 4A at AND gate 104D of FIG. 4D and then further added with the ADRMTCH 6 signal at AND gate 132 to produce a SINKNOT signal from NOR gate 96. The SINKNOT signal turns ON NPN transistor 98, connecting a resistor from $V_{csc}$ voltage bus 22 to ground, raising the amount of current flowing through bus 22. When more current goes through bus 22, the current through resistor 100 of FIG. 3 increases the signal from the difference amplifier 52 in the receiver which sends a voltage signal representing current $I_{csc}$ back to the A/D of MCU 20 to provide a status signal to the computer. This response occurs if the status line corresponding to CMD0 is a logic 1.

If the status line is LOW, the controller will either inhibit the current sink circuit from not sending a status signal back to D/R 18 or it will turn OFF the current sink circuit. The status line reads its status to the drive/receiver 18 by turning on the current sink circuit transistor NPN 98 if the status line corresponding to CMDO is HIGH, the same way the status line responds if the data bit is HIGH.

FLOW CHART

Figure 5A:
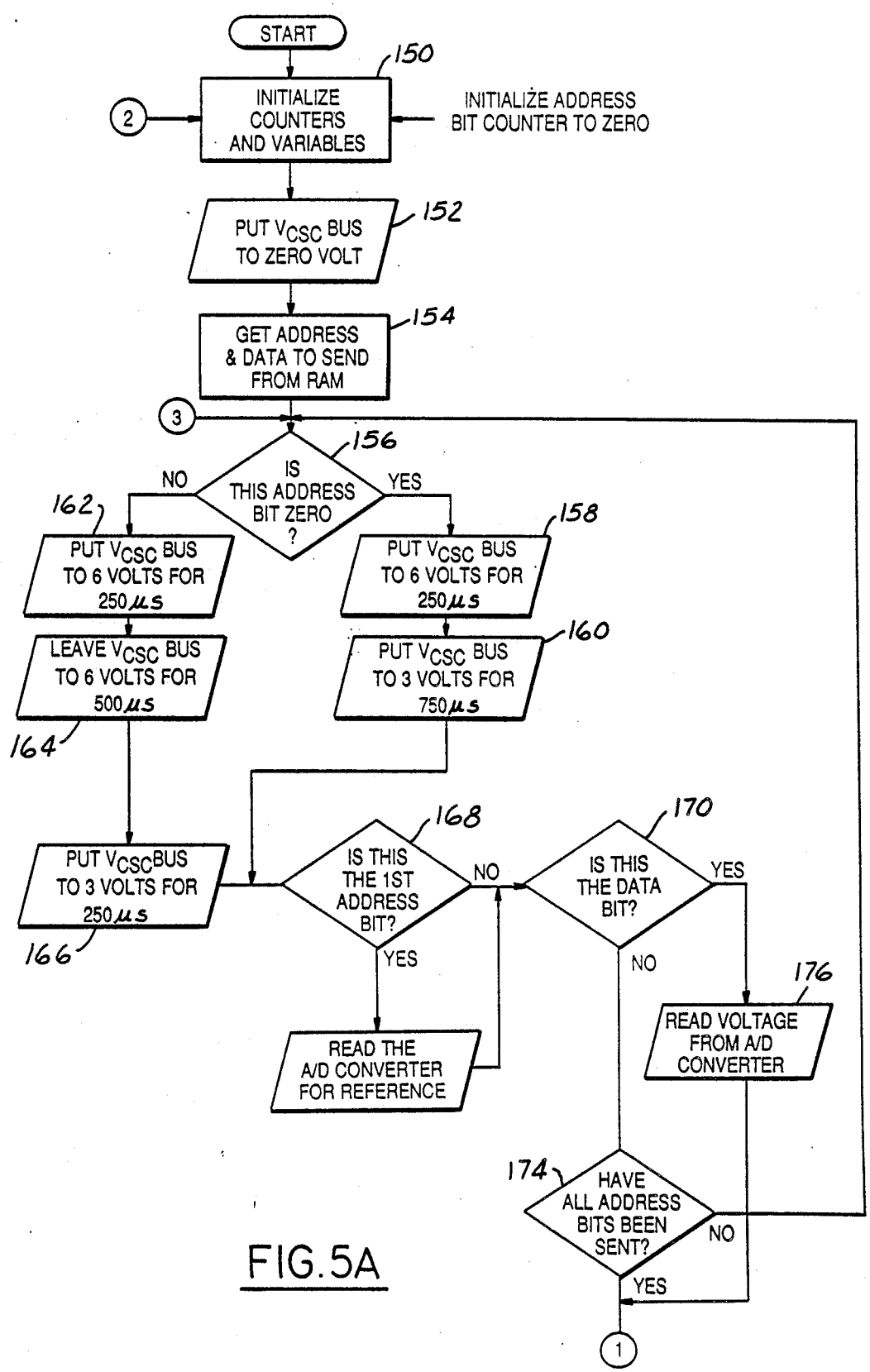
FIG. 5A and 5B illustrates a flow diagram of the operation of the system.
Figure 5B:
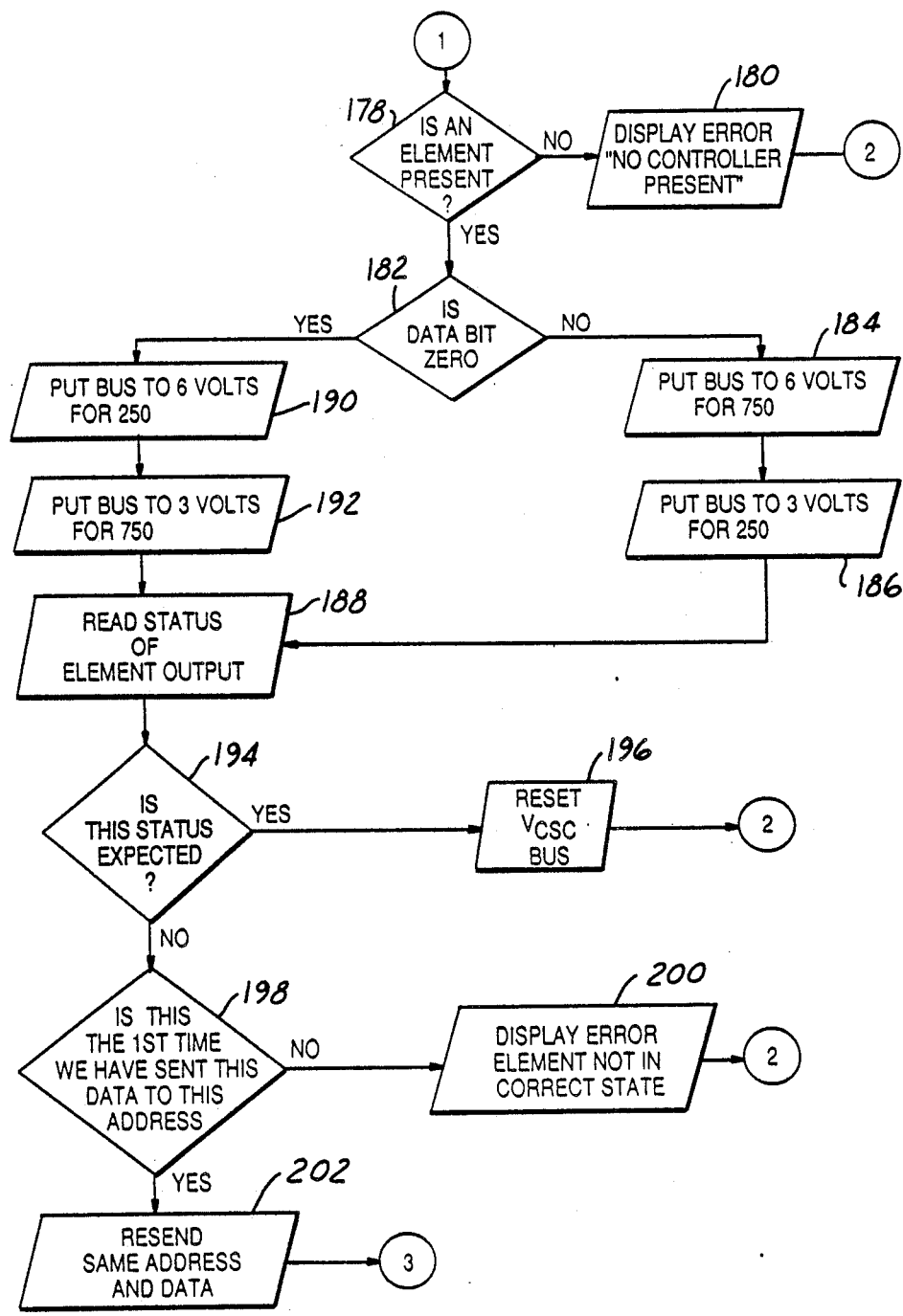

With reference now to FIGS. 5A and 5B, there, a flow chart depicts a program executed by MCU 20. After STARTUP of the program and after the 20 ma power ON delay, as indicated in processing-function block 150, MCU 20 executes a small start-up program which sets all CPU registers with correct values and clears all information presently in memory before accepting information from D/R 18. MCU 20 also initializes the counters in RAM and the stored variables. Counters, such as the three-bit counter 68, is set to 0. The desired addresses to be sent over the bus to D/R 18 are stored in memory and all initial conditions are met.

In this embodiment, the stored information illustratively could include the sequence for addressing four controllers and for addressing four groups of eight devices. As can be appreciated by those skilled in the art, MCU 20 operates in the MHz range while system 10 operates around the one KHz range. Hence, MCU 20 can perform many tasks before system 10 reacts. As indicated in output operation block 152, the program tells MCU 20 to put the $V_{csc}$ bus to 0 volt. In performing this instruction, MCU 20 writes to ports A and B in a manner providing to the inputs of AND gate 50 of D/R 18 in FIG. 3 a LOW signal in order to initiate and to establish the OFF-state of the square wave forming $V_{csc}$ of FIG. 2A.

MCU 20 performs output operations by writing the appropriate logic level signals to ports A and B which, in turn, controls the output levels placed on bus 22 by D/R 18.

With the $V_{csc}$ bus at 0 volt, the addresses and data sent over the bus must come from RAM. Therefore, MCU 20 receives, as in processing-function block 154, the instruction to get the addresses and data from RAM. MCU 20 sends a serial stream message of five address bits and a data bit to D/R 18 for transmission over bus 22 for commanding each electrical device.

MCU 20 looks at the first address bit and determines whether or not the bit is zero as indicated in decision block 156. If the bit is zero, MCU 20 will do the operations specified by the YES branch. Otherwise, it will perform the operations along the NO branch. Assuming the YES branch is taken, MCU 20 receives the instruction in output-operation block 158 and executes that instruction by writing to port A and B to put the $V_{csc}$ bus at 6 volts for 250 microseconds. Then MCU 20 is instructed to execute the instruction in the output-operation box 160 of placing the $V_{csc}$ to 3 volts for 50 microseconds. These two successive operations form the 25 percent duty cycle pulse used by D/R 18 to form the zero address bit. If the NO branch is followed, MCU 20 is instructed to perform the sequential output operations specified in block 162, 164 and 166 which causes the $V_{csc}$ bus to go to 6 volts for 250 microseconds, as in block 162; to leave the bus at 6 volts for 500 microseconds, as in block 164; and then put the bus at 3 volts for 250 microseconds, as in block 166. These operations form the 75 percent duty cycle pulse used to form the HIGH bit signal in D/R 18.

When the polarity of the bit has been established, MCU 20 checks to see, as in decision block 168, if the present bit is the first address bit. If this bit is the first address bit, MCU 20 executes the instruction in input-operation block 172 in the YES branch which requires the reading of the A/D converter for a reference voltage then proceeds to decision block 170 which checks to see if the bit is the data bit. Obviously, the bit is not the data bit because, in accordance with the NO branch, it is the first address bit; therefore, MCU 20 checks to see if all the address bits have been sent as instructed in decision block 174. Obviously, since this is the first bit, all the address bits have not been sent, so MCU 20 takes the NO branch back to decision block 156 in order to get the other address bits.

When MCU 20 reads the A/D converter for the referenced current or quiescent current, which is equal to approximately 2.5 mA times the number of individual electrical devices or elements, and, if there are 32 elements, then the reference current will be 80.0 mA. This reference current value is stored in memory as a reference voltage for later use.

If this present bit is not the first address bit, then MCU 20 takes the NO branch to decision block 170 and determines whether or not this is the data bit. If it is, then MCU 20 takes the YES branch, otherwise, it takes the NO branch to decision block 174. If this is the data bit, MCU 20 executes the instruction in the input-operation block 176 which calls for reading the input voltage from the A/D converter.

MCU 20 compares this new value in block 178 with the stored reference or quiescent value to determine if a controller is present. If one controller is present, the voltage reading from the A/D converter will be approximate current 15 mA above the quiescent reading.

If no controllers are present, then the NO branch is taken to the output-operation block 180 which instructs MCU 20 to send to the display unit signals which causes the unit to display the error and to indicate that the controller is not present, and then proceed to reinitialize MCU 20 as instructed in block 150. If the YES branch is taken, then MCU 20 checks the data bit to see if it is zero as in decision block 182. If the NO branch is taken, then MCU 20 executes instructions in output-operation blocks 184 and 186 to create a 75 percent duty cycle pulse representing a HIGH data bit. Then MCU 20 proceeds to input-operational block 188 and reads the status of the element via the output of the A to D converter. If the data bit is zero, then MCU 20 takes the YES branch of decision block 182 and proceeds to execute instructions in output-operation blocks 190, 192 and 188. The instructions in output-operational blocks 190 and 192 cause MCU 20 to write a 25 percent duty cycle pulse on the bus for 250 microseconds Then MCU 20 proceeds to input-operational block 188 and reads the status of the element via the output of the A to D converter. As in decision block 194, if the expected status indication is obtained, then the YES branch is taken to output-operational block 196 where the instruction to reset the $V_{csc}$ bus is performed. Then, MCU 20 returns to the processing-function block 150.

MCU 20 then checks to see if this is the first time this data has been sent to this address in accordance with decision block 198. If not, then the NO branch is taken to the output-operation block 200 which instructs MCU 20 to display the error message that the element is not in the correct state. Then MCU 20 is instructed to proceed to processing-function block 150. If the YES branch is taken, then MCU 20 follows the instruction in output-operational block 202 and resends the same data to the same address and then enters the loop at decision block 156.

TIMING DIAGRAMS

FIG. 6 provides timing diagrams depicting signals used to command ON electrical device 2. Note that two address bits enable the controller and three address bits select the electrical device. Also note that the gates and registers RESET upon the occurrence of $V_{csc}$ returning to below three volts.

I claim:

1. A multiplex system within a motor vehicle for commanding and monitoring the status of a plurality of electrical devices or elements disposed throughout the motor vehicle, each of the elements having command terminals for receiving commands in the form of a voltage signal for activating or deactivating each of the elements, each of the command terminals also being used to provide a status indication in the form of a current signal upon being commanded, said system comprising:

(a) a bi-directional, single wire bus for transmitting voltage signals in a first direction and current signals in a second direction, said bus being routed throughout the vehicle, said voltage and said current signals being developed in said multiplexed system;

(b) a plurality of smart octal controllers disposed throughout the motor vehicle, each of said plurality of controllers having (1) a single input/output terminal connected by a single wire to a single point along said bus for receiving the transmitted voltage signals from said bus and for sending the current signals to said bus; (2) a pair of input power lines connected across a power source of the vehicle; (3) a group of eight output command lines with each line from the group coupled to one of the elements disposed throughout the vehicle for commanding ON or OFF the element; (4) a group of eight status lines with each line from the group coupled to a corresponding one of the elements; and (5) means for a preprogrammed identifying address;

each of said plurality of controllers providing command signals to the eight elements for turning ON or OFF an individual element of said group; each of said plurality of controllers receiving in response to the command, a current signal indicative of the status of a commanded element;

(c) a driver and receiver means connected to the power source of the vehicle and a terminal of said single-wire bus for generating an undulating voltage signal containing a series of dual-duty cycle voltages forming the address and command information of which a first portion of the address information is used to address one of said plurality of controllers, one of said plurality of controllers being addressed if the first portion of the address information matches the predetermined address code, and of which a second portion of the address information is used to enable said addressed controller to command the operation of a selected element connected thereto;

said undulatory voltage signal being driven onto said bus and into each of said plurality of controllers by said driver and receiver means, said driver and receiver means also having means for receiving from said bus the current signals sent over said bus by each of said addressed controllers indicative of the status of the commanded element;

(d) display means for displaying the status of each of the commanded elements; and (e) a microcomputer means interconnecting said driver and receiver means and display means for (1) writing logic commands to said driver and receiver means for controlling the generation of the undulatory voltage used to develop the address and command information placed on said bus for addressing and commanding each of said plurality of controllers in order to cause each of said plurality of controllers to operate the elements connected thereto, (2) reading current signals indicative of the status of the commanded element that is sent by said addressed controller, (3) establishing a history of performance of each of the commanded elements and (4) transferring updated status information to said display means.

2. Apparatus in accordance with claim 1 wherein said undulatory voltage signal contains at least six independent duty-cycle pulse signals, at least two of the pulses being used to develop an address of one of said plurality of controllers by matching the predetermined address fixedly assigned to each controller and at least three of the six pulses being used to enable said addressed controller to command ON or OFF, using a voltage signal, one of the connected elements; and a single, independent duty-cycle pulse signal indicative of the polarity of the command going to the addressed element.

3. Apparatus in accordance with claim 2 wherein said controller includes (1) means for converting said address and command dual duty-cycle pulses into address and command binary bits, (2) means for detecting said address and data bits, (3) means for acknowledging the addressing of each of said plurality of controllers, (4) means for commanding one element of the connected elements ON or OFF in response to a polarity of the detected data bit, and (5) means for detecting a current signal from the commanded elements and then transmitting the current signal over said bus to said driver and receiver means.

4. In a vehicle multiplex system for both controlling and monitoring status of a plurality of electrical devices or elements disposed throughout the motor vehicle, the elements containing control and status indication terminals, the system comprising:

a. microcomputer means having a predetermined program which controls addressing, commanding and monitoring the elements and which produces a series of logic signals at least a pair of output ports of said microcomputer means that represent the address and command information needed for operating the plurality of elements;

b. driver and receiver means adapted to receive the series of logic signals from said microcomputer means and to selectively convert the series of input logic signals into a series of dual-duty cycle waveform, output voltage signals of a chosen format containing address and data information needed to operate the plurality of elements;

c. a bi-directional, single wire bus connected to the driver and receiver means at one end for transmitting the voltage signals in a first direction needed to operate the plurality of elements and for transmitting status information concerning the operated element in the form of a current signal from the element in a second direction, said bus being routed throughout the vehicle; and d. a plurality of controllers, each of which being connected at an output end to eight of the plurality of elements so as to permit commanding ON or OFF individual elements of the connected elements in response to a match between the address information and a preassigned controller address code and to permit obtaining a current signal from the commanded element indicative of the operational status, each of said plurality of controllers having means for (a) forming a single point input connection with said bus and for (b) forming a power connection across a vehicle battery to receive battery power;

5. Apparatus in accordance with claim 4 wherein said microcomputer means includes means for reading the status information of each commanded element transferred by said addressed controller, and wherein said microcomputer means also includes means for transferring the status information to said display means for display.

6. Apparatus in accordance with claim 5 wherein said microcomputer means supplies (1) a two bit address code which matches the preassigned address code of selected controller, (2) a three bit code for selecting which element of the group of eight elements to command, and (3) a single bit code for determining whether to command ON or OFF the selected element.

7. Apparatus in accordance with claim 6 wherein each of said plurality of controllers also contain circuits responsive to current signals emanating from the status indication terminals of the commanded element.

8. Apparatus in accordance with claim 7 wherein said driver and receiver means also include means for converting the current signals from said plurality of controllers into voltage signals for use by said microcomputer means in reading the status information of each commanded element.

* * * * *